United States Patent
Sosebee

(10) Patent No.: US 10,477,872 B1
(45) Date of Patent: Nov. 19, 2019

(54) METHOD AND APPARATUS FOR REMOVING WINGS FROM A POULTRY CARCASS

(71) Applicant: Foodmate US, Inc., Ball Ground, GA (US)

(72) Inventor: Steve Sosebee, Ball Ground, GA (US)

(73) Assignee: Foodmate US, Inc., Ballground, GA (US)

( * ) Notice: Subject to any disclaimer, the term of this patent is extended or adjusted under 35 U.S.C. 154(b) by 0 days.

(21) Appl. No.: 16/400,497

(22) Filed: May 1, 2019

(51) Int. Cl.
*A22C 21/00* (2006.01)

(52) U.S. Cl.
CPC ...... *A22C 21/0023* (2013.01); *A22C 21/0007* (2013.01); *A22C 21/0053* (2013.01)

(58) Field of Classification Search
CPC . A22C 21/00; A22C 21/0023; A22C 21/0038; A22C 21/0046
USPC .......................... 452/149–156, 166, 167, 169
See application file for complete search history.

(56) References Cited

U.S. PATENT DOCUMENTS

| | | | | |
|---|---|---|---|---|
| 4,562,613 A * | 1/1986 | Lewis | ................ | A22C 21/0023 452/160 |
| 5,312,291 A * | 5/1994 | van den Nieuwelaar | .................... | A22C 21/0053 452/165 |
| 5,429,549 A * | 7/1995 | Verrijp | ................ | A22C 21/0023 452/154 |
| 8,430,728 B2 * | 4/2013 | Hazenbroek | ....... | A22C 21/0023 452/169 |
| 8,727,839 B2 * | 5/2014 | Hazenbroek | ....... | A22C 21/0023 452/169 |

* cited by examiner

*Primary Examiner* — Richard T Price, Jr.
(74) *Attorney, Agent, or Firm* — Womble Bond Dickinson (US) LLP

(57) ABSTRACT

A method and apparatus for separating wings from a poultry carcass includes an overhead conveyor for conveying partially processed poultry carcasses sequentially along a processing path back-first. Each carcass is tilted on its back and its wings are separated and spread out to the sides of the carcass. The scapula bones of the carcass are urged to a desired position. A pre-cut is made in the back of the carcass along a specified location to sever a primary tendon associated with the scapula and holding each wing to the carcass. The wings are tensioned to dislocate the shoulder joints and to begin to pull the balls and sockets of the joints apart at the shoulder. Rotary blades cut through a piece of back meat and then between the separated balls and sockets of the shoulder joints while the wings are being prevented from moving along with the carcass. This progressively opens up the dislocated shoulder joint as the rotary blades cut until the wings are completely severed and removed from the carcass. The cutting of bones and attendant bone pieces and shards in the wing parts is virtually eliminated and valuable breast meat is not sacrificed for the sake of meatier wings.

19 Claims, 9 Drawing Sheets

METHOD AND APPARATUS FOR REMOVING WINGS FROM A POULTRY CARCASS

TECHNICAL FIELD

This disclosure relates generally to industrial poultry processing equipment and more specifically to devices and methods for removing wings from a poultry carcass as the carcass is conveyed along a processing path.

BACKGROUND

The processing of poultry such as chickens and turkeys (birds) has become highly automated. Birds generally are conveyed suspended by their legs from shackles of an overhead conveying systems along processing lines for evisceration, cut-up, and further processing. It is highly desirable to perform as many of the processing operations on the birds as possible while the birds are suspended from their shackles to minimize handling and ensure greater uniformity in the cutup and processing of the birds.

Accordingly, the birds are conveyed through various processing devices while they move in series suspended from their shackles along the processing path. For example, the birds can be de-feathered, decapitated, opened, eviscerated, and cut apart while being advanced progressively along a processing path suspended from shackles. As a result, the labor required for processing poultry carcasses is significantly reduced while uniformity and adjustability in the sectioning of the poultry carcasses into various poultry parts is more predictable.

Chicken wings, commonly cooked and served as "buffalo wings," have become a popular takeout item for home consumption and as menu items in restaurants and fast food outlets. A demand has emerged for larger and meatier wings. To accommodate this demand, extra meat generally is taken from breast portions the birds adjacent the wings and remains attached to the wings. This is not the most desirable meat to leave attached to the wings because breast meat is significantly more valuable than other meat on the carcass such as back meat on either side of the backbone. However, back meat heretofore has been difficult to remove from a poultry carcass. There is a need for a method and apparatus that separates wings from poultry carcasses and leaves a piece of back meat with the wings to make the wings meatier rather than a piece of valuable breast meat.

To ensure efficiency and proper cooking of the wings, it is important to retailers, restaurants, and others that all the wings to be cooked in a batch are of substantially the same weight. Larger wings from larger birds do not cook as fast as smaller wings from smaller birds, and thus there is a possibility that the larger wings of a batch with smaller wings will be undercooked or that the smaller wings in a batch with larger wings will be overcooked. The result is poor quality end product that may have to be discarded. There is a need for a method and apparatus for removing wings from poultry carcasses that ensures that the separated wings of a batch are of substantially the same weight.

In the prior art, wing removal machines and processes also result in bone pieces and shards being left with removed wings or the carcass. This is because accurately slicing through the wing precisely between the bones of the shoulder joint has been a difficult challenge. Average "yield" of quality wings without cut-through bones and shards has hovered around 70% for a long time. There is a need for a method and apparatus for removing wings from poultry carcasses that increases this yield substantially into the 90 percentile.

Generally, a need exists for a poultry wing remover and method that addresses the above and other needs with speed, precision, and reliability. It is to the provision of such a poultry wing remover and method that the present invention is primarily directed.

SUMMARY

Briefly described, a previously processed de-feathered and beheaded poultry carcass comprises a breast, a back, legs, and attached wings. The wings are to be removed by the apparatus and method of the present invention. Each carcass is suspended by its legs from an overhead shackle and conveyed by the shackle along a processing path. For the present operation, each carcass is conveyed back-first and the weight of each bird has previously been determined. If an incoming carcass is smaller than a preset limit (meaning its wings will be small), then an ejector plate is raised up and the small carcass is guided over the apparatus of this invention without being processed. Its small wings are not removed and added to the batch.

Carcasses that are not ejected are pulled by their shackles progressively through the apparatus for removal of their wings. A step-up ramp tilts each carcass back so that it enters the apparatus substantially lying on its back. Upper guide plates engage the breast of each carcass just above the wing pits and wing spreader bars unfold the wings and spread them outwardly to the sides. As each carcass continues to move along the processing path, left and right back support bars engage the back of the carcass on either side of the backbone and center the carcass accurately in the apparatus. The back support bars are shaped and configured to guide the scapula bones of each carcass progressively to a predetermined location in preparation for a pre-cut.

Two elongated pre-cut blades are disposed on either side of the back support bars with their sharpened edges facing up. The blades are positioned and angled such that when the scapula on either side of a carcass is properly positioned by the back support bars, the blades begin to slice tissue of the carcass just downstream of the wings. There is a major tendon at this location and the pre-cut blades slice through and cut this tendon. With the tendon cut and tissue pre-sliced, the wing begins to pull away from the carcass due to tension, which begins to dislocate and separate the shoulder joint. The two pre-cut blades diverge away from each other to direct the pre-cuts to spinning rotary knife blades at the downstream end of the apparatus.

The rotary knife blades are oriented so that they begin their cut in the back meat of the carcass just downstream of the wings slicing off pieces of this meat that will remain with the separated wings. As the rotary blades progress, tissue and tendons associated with the wings are progressively cut by the rotary blades. This increasingly frees the wings so that the balls and sockets of the shoulder joints continue to separate during the cut. As the cutting progresses, the now partially cut-away wings engage a downturned stop bar, which retards the downstream motion of the wings as the carcass continues to be pulled downstream. This creates tension in the wings tending to pull them away from the carcass. The blades eventually cut completely through the flesh and tendons between the balls and sockets of the shoulder joints thereby separating the wings from the carcass. The separated wings fall to a collection location below the apparatus.

As a result of the process, bone shards and pieces left in the wings are far less common because the cuts are made between the separated balls and sockets of the shoulder joints. It has been demonstrated that yields of quality wings (i.e. wings without cut bones) are increased from around 70 percent to 90 or 95 percent. The resulting wings are still meaty because a piece of sliced off back meat is left attached to the wings, but valuable breast meat has not been sacrificed in the process. Small carcasses that would yield small wings are detected and bypass the process, resulting in a more uniform weight of wings in a batch.

The above and other features, aspects, and advantages of the invention will be better appreciated upon review of the detailed description set forth below when taken in conjunction with the accompanying drawing figures, which are briefly described as follows.

DETAILED DESCRIPTION

Figure 1:
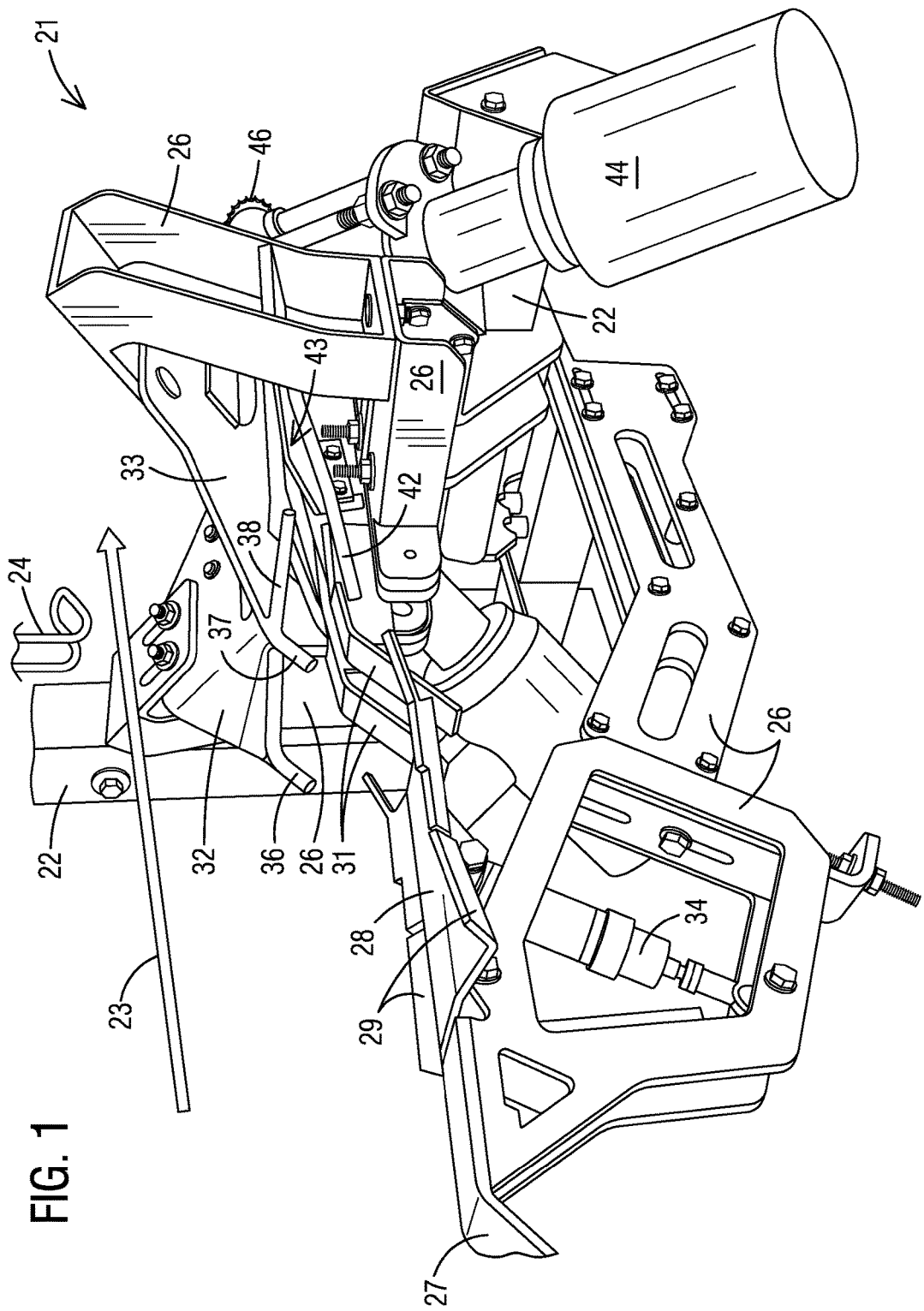
FIG. 1 is a perspective view of an apparatus for removing wings from a poultry carcass that exemplifies principles of the invention in one preferred embodiment.

Reference will now be made to the drawing figures, wherein like reference numerals indicate like parts throughout the several views. FIG. 1 shows an example apparatus 21 for removing wings from a poultry carcass according to principles of the invention. The apparatus 21 is mounted on support beams 22 along a poultry processing line (not shown). Partially processed poultry carcasses are conveyed along a processing path 23 by an overhead conveyor system. The poultry carcasses are suspended by their legs from traditional shackles 24 that are moved along the processing path 23 by the conveyor. The carcasses are progressively pulled back-first through the apparatus 21 by the shackles, during which time the method of the invention is carried out.

With further reference to FIG. 1, the apparatus 21 comprises a frame 26 that supports components of the apparatus. A ramped tongue 27 is located at the upstream end of the apparatus for initial engagement of poultry carcasses. An ejector plate 28 having upturned side edge portions 29 is located just downstream of the ramped tongue. An actuator 34 is configured to pivot the plate up about its upstream end upon command. If a carcass that has been determined to be too small approaches the apparatus, the ejector plate is pivoted or flipped up by the actuator 34. The ejector plate then guides the small carcass over the top of the apparatus so that its wings are not removed and are not added to a batch of wings being collected.

In its normal position shown in FIG. 1, the ejector plate engages and stabilizes poultry carcasses (which may be swinging) and begins to align them for their journey through the apparatus 21. Downstream of the stabilizer plate 28 are two spaced apart tilting sleds 31 that tilt poultry carcasses forward so that their backs face in a generally downward direction. This prepares the carcasses for traversing the apparatus of the invention on their backs.

Two upper guide plates 32 and 33 are positioned on either side of the processing path and each has a lower edge portion. The lower edge portions of the upper guide plates engage the breasts of moving carcasses above the wings to align and hold down the carcasses during the process. Two carcass guide bars 36 and 37 extend in a generally upstream direction from the upstream ends of respective upper guide plates 32 and 33 to guide carcasses between the upper guide plates. Wing spreader bars 38 (visible) and 39 (not visible) extend outwardly and in a downstream direction from the carcass guide bars 36 and 37. The wing spreader bars 38 engage the wings at the elbow joint and progressively unfold and pull the wings to the side of the carcass. A back support assembly 43, described in detail below, is positioned below the lower edges of the upper guide plates. The back support assembly comprises a pair of spaced support bars that engage a carcass on either side of the backbone. Lower guide bars 42 (visible) and 41 (not visible) extend along and outboard of the back support assembly 43 and progressively position the wings of a poultry carcass for separation as detailed below.

Two electric motors 44 (only one of which is visible in FIG. 1) are disposed on either side of the apparatus. Each electric motor spins a serrated rotary blade 46 (visible) or 47 (not visible) located at the downstream end of the apparatus. The rotary blades 46 and 47 slice through back meat downstream of the wings and cut between the balls and sockets of separated shoulder joints normally connecting the wings to the carcass. Once separated, the wings with a piece of the sliced-off back meat attached fall to a collection location below.

Figure 2:
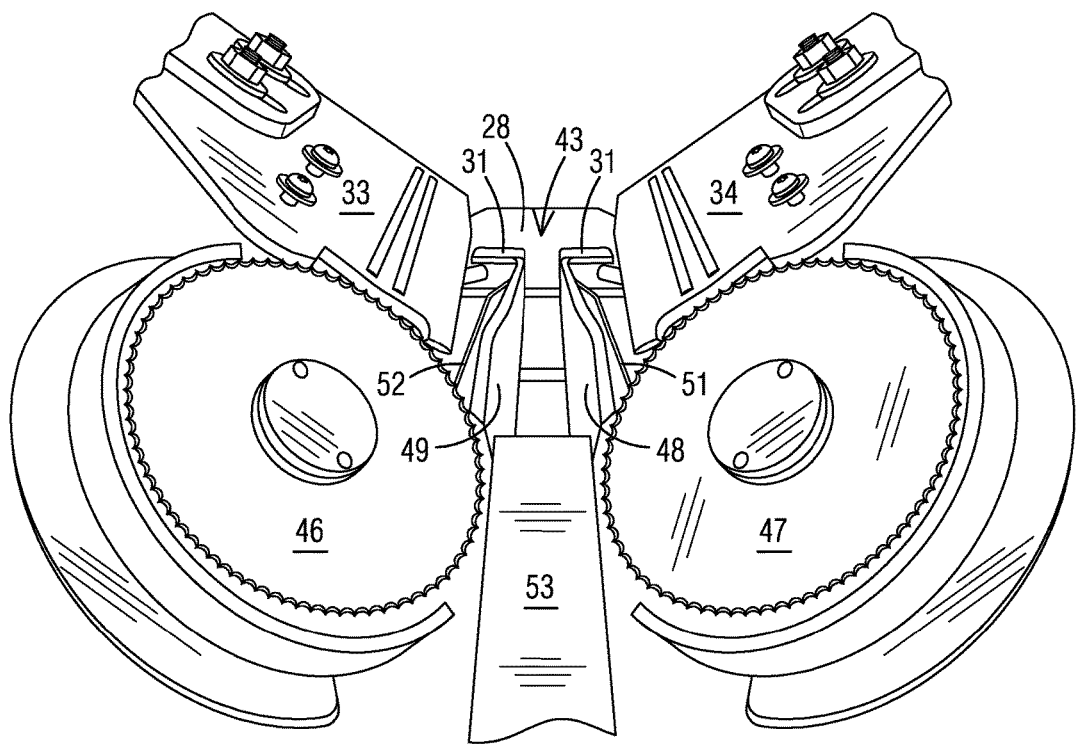
FIG. 2 is a perspective view along the processing path from a downstream location of the apparatus of FIG. 1 showing various components of the apparatus.

FIG. 2 is a view of the apparatus of FIG. 1 from a downstream location. The ejector plate 28 is visible as are the two tilting sleds 31. Angled upper guide plates 33 and 34 on either side of the processing path have lower edges extending above and to either side of the back support assembly 43. The back support assembly 43 includes two spaced apart back support bars 48 and 49. The back support bars have upper edge portions that are machined and configured to guide the scapula bones on either side of the backbone adjacent the wings to predetermined positions in preparation for removal of the wings.

Two pre-cut blades 51 and 52 are disposed along the outsides of the two back support bars 48 ad 49. With the scapulae properly positioned by the back support bars, the pre-cut blades begin to make a pre-cut through tissue below the wings. The pre-cut blades also cut through a major tendon behind each wing, allowing the wings to begin to pull away from the carcass at the shoulder joints thereby dislocating and separating the balls and sockets of these joints. The pre-cut blades are angled to diverge from each other in the downstream direction so that they guide the pre-cuts they have made toward the serrated rotary blades of the apparatus.

The two serrated rotary blades 46 and 47 are arranged at angles to the processing path downstream of the back support assembly 43. The blades are spun at high rates by the electric motors 44 and are sharp. The pre-cuts made by the pre-cut blades 51 and 52 are guided by the diverging pre-cut blades to the rotary blades 46 and 47. The rotary blades 46 and 47 begin first to slice through tissue of the back just downstream of the shoulder joints between the wings and the carcass. Since the major tendon has previously been cut by the pre-cut blades, the shoulder joints are partially dislocated with their balls and sockets partially separated at this point.

As the rotary blades 46 and 47 continue to slice through tissue toward the shoulder joints, more tendons are cut thereby allowing the dislocated shoulder joints to separate further. By the time the rotary blades reach the shoulder joints themselves, the balls and sockets of these joints are significantly separated so that the rotary blades cut between the balls and sockets without engaging bone or cartilage. As a consequence, the wings are severed cleanly from the carcass with very few bones having been cut, thereby greatly reducing bone pieces and shards in the wing parts.

Figure 3:
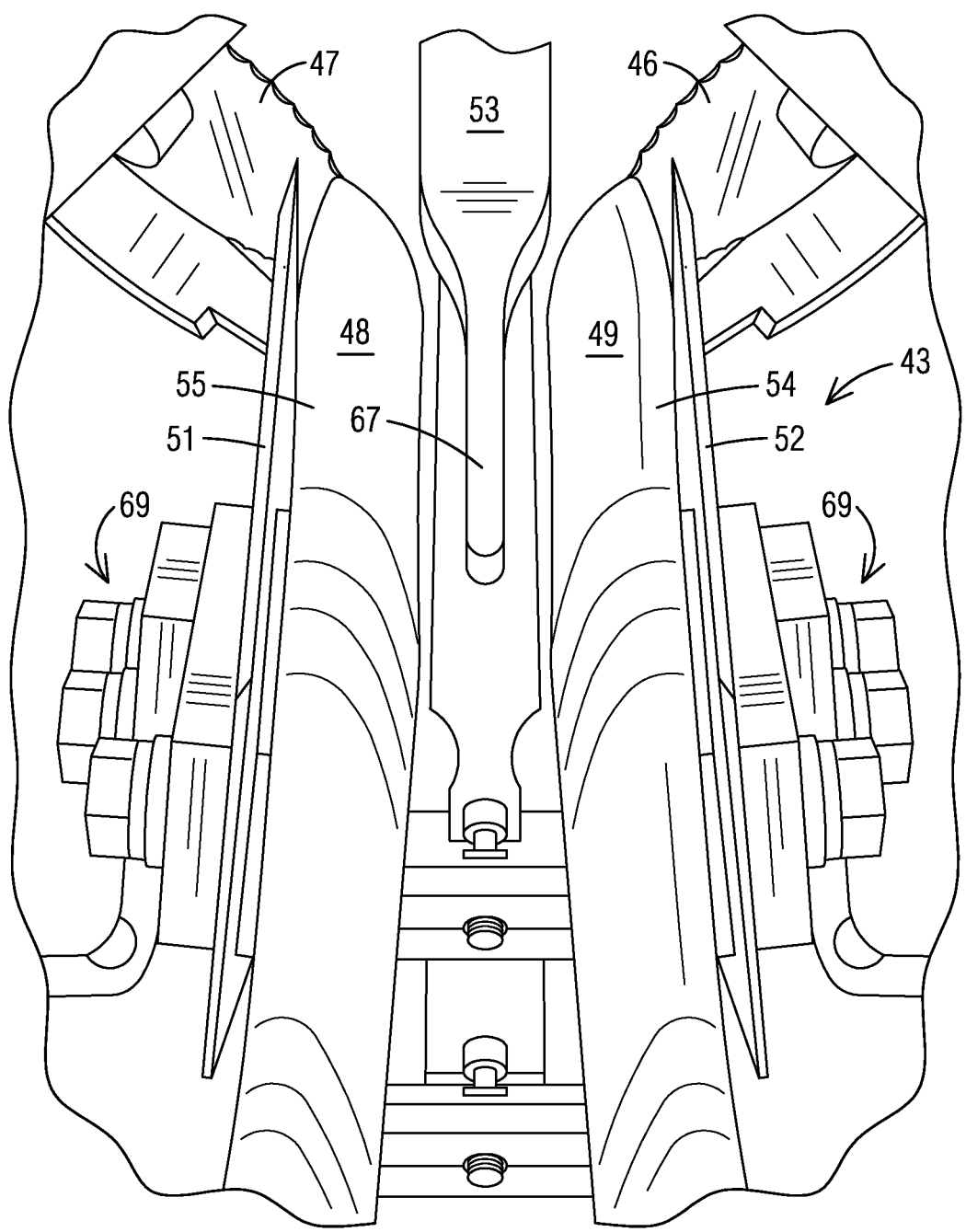
FIG. 3 is an enlarged perspective view along the processing path from an upstream location showing details of the back support bars and pre-cut blades.

FIG. 3 shows the back support assembly 43 in more detail. The two spaced apart back support bars 48 and 49 extend in the direction of the processing path. The upper edge portions of the back support bars 48 and 49 are shaped such that they progressively urge the scapula bones of a carcass to positions just outside the support bars approximately at locations 54 and 55. With the scapulae properly positioned, the moving carcass engages the pre-cut blades 52 and 53, which begin to cut through tissue along the back of the carcass below the scapula. In the process, a major tendon associated with each wing is cut. The pre-cut blades 51 and 52 diverge from each other to guide the pre-cuts toward the two rotary blades 46 and 47. A lift plate 67 gradually rises from between the back support bars 48 and 49. The lift plate engages and pushes upwardly on the backbone of the carcass as it engages and moves past the rotary blades to ensure a precise cut.

Figure 4:
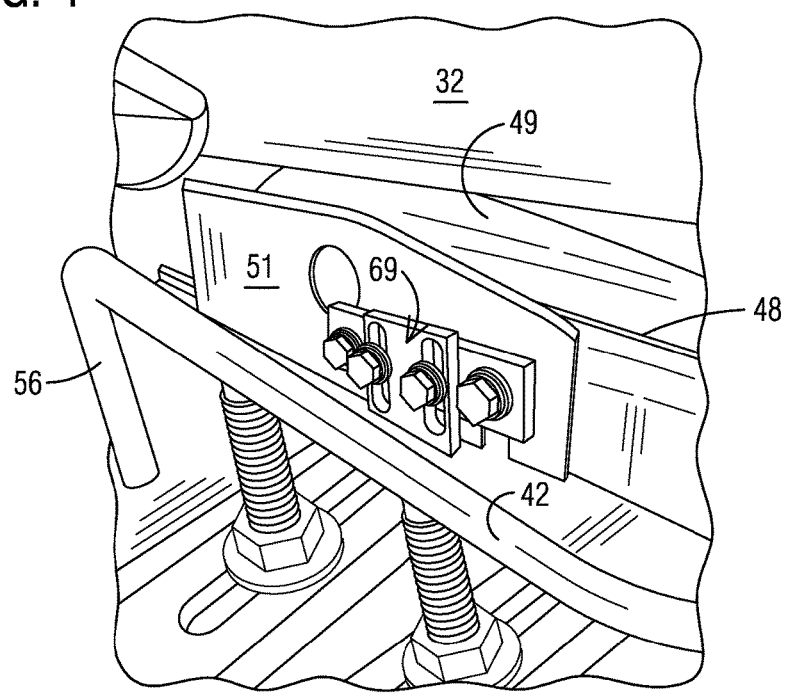
FIG. 4 is an enlarged perspective view from beneath one of the hold-down plates showing the pre-cut blade to the outside of its back support bar.

FIG. 4 is a detailed view of pre-cut knife 51 mounted outboard of back support bar 48. A blade adjustment mechanism 69 allows for selective adjustment of the position and angle of the pre-cut blade to tailor the pre-cut as necessary to accommodate particular carcasses and maximize the efficiency of the pre-cut. Upper guide plate 32 is seen above the pre-cut blade and lower guide bar 42 is seen extending below and to the outside of the pre-cut blade. The lower guide bar helps to position wings of carcasses to the side and guide them just before they are severed and removed by the rotary blades.

Figure 5:
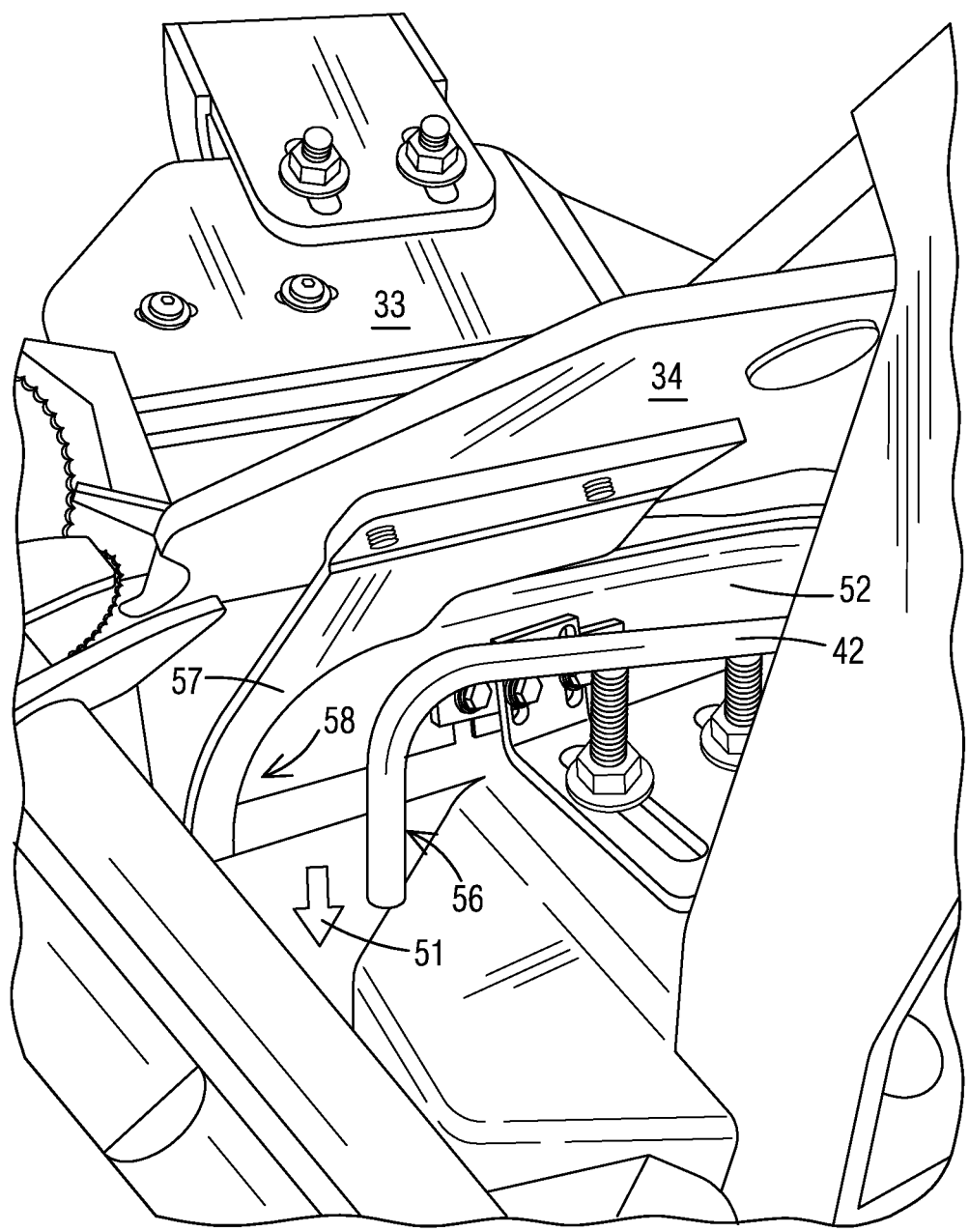
FIG. 5 is an enlarged perspective view showing one of the wing guide bars and its downturned end and showing the curved wing stop bar.

FIG. 5 is a view from a different perspective showing the upper guide plates 33 and 34 and one of the pre-cut blades 52. The lower guide bar 42 is seen along and outside of the pre-cut blade 52. The lower guide bar terminates in a downturned end portion 56. A downwardly curved stop bar 57 has an end portion that defines an outlet channel between itself and the downturned end portion 56 of the lower guide bar. Removed wings fall from this channel downwardly as indicated by arrow 56 and are collected at a collection station (not shown) below the apparatus. Of course, there is a corresponding lower guide bar and stop bar on the opposite side of the back support assembly for the opposite wing.

The stop bar 57 is shaped and positioned so that outstretched wings moving along with a carcass engage the stop bar as the rotary blades 46 and 47 progressively slice through tissue in the vicinity of the shoulder joints. This retards the downstream motion of the wings relative to the carcass, which in turn pulls and creates tension at the shoulder joint. The tension tends to urge the ball and socket of the separated shoulder joint further apart in the course of the cut. As the rotary blades 46 and 47 continue to cut through tissue and additional tendons, the tension progressively pulls the ball and socket of the shoulder joint further apart. As a result, the rotary blades 46 and 47 are able to pass between the balls and sockets without cutting bone or cartilage associated with the shoulder joint.

Figure 6:
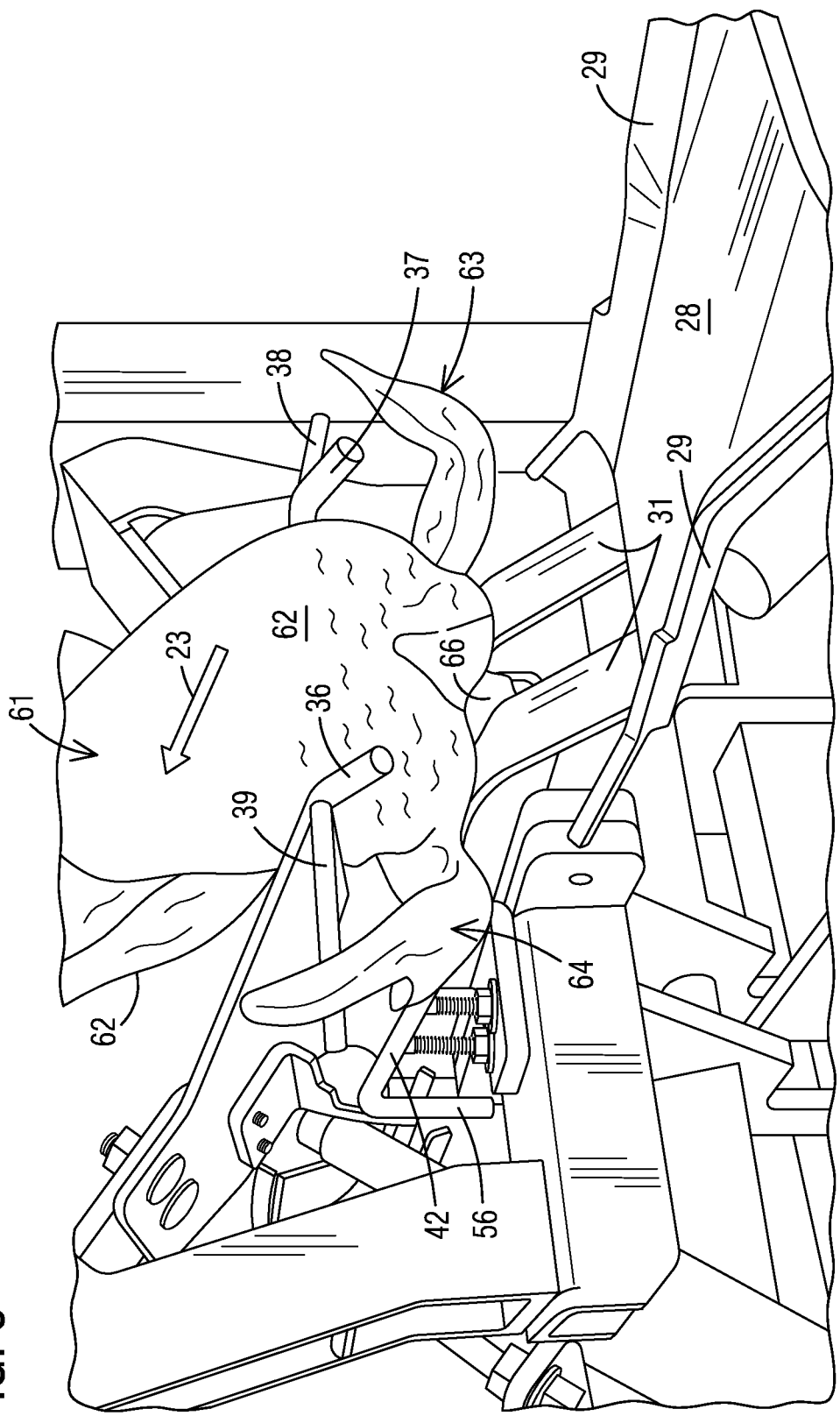
FIG. 6 is a perspective view from an upstream location showing a poultry carcass with wings attached as it appears when being pulled into the apparatus of FIG. 1 for removal of the wings.

FIG. 6 is a perspective view showing a partially processed poultry carcass 61 entering the apparatus of this invention for wing removal. The carcass 61 has a breast 62 that faces upwardly during the process since the carcass is conveyed through the apparatus on its back 62. Wings 63 and 64, to be removed, extend outwardly to the sides of the carcass. The upper guide plates 33 and 34 have engaged the sides of the breast of the carcass just above the wing pits and are beginning to press down on the carcass to align it and hold it down onto the back support assembly (not visible in FIG. 6).

Wing spreader bars 38 and 39 are engaged in FIG. 6 with the wings 63 and 64 and specifically with the wingtips. As the carcass moves in direction 23, the wing spreader bars 38 and 39 spread or stretch out the wings (which can be rather tightly folded) to the sides of the carcass. The lower guide bars 41 (not visible) and 42 (visible) engage the undersides of the wings to help maintain their spread-out orientations and to guide them through the apparatus. The wings 63 and 64 are thereby secured in the optimum spread-out orientation throughout the wing removal process.

Figure 7:
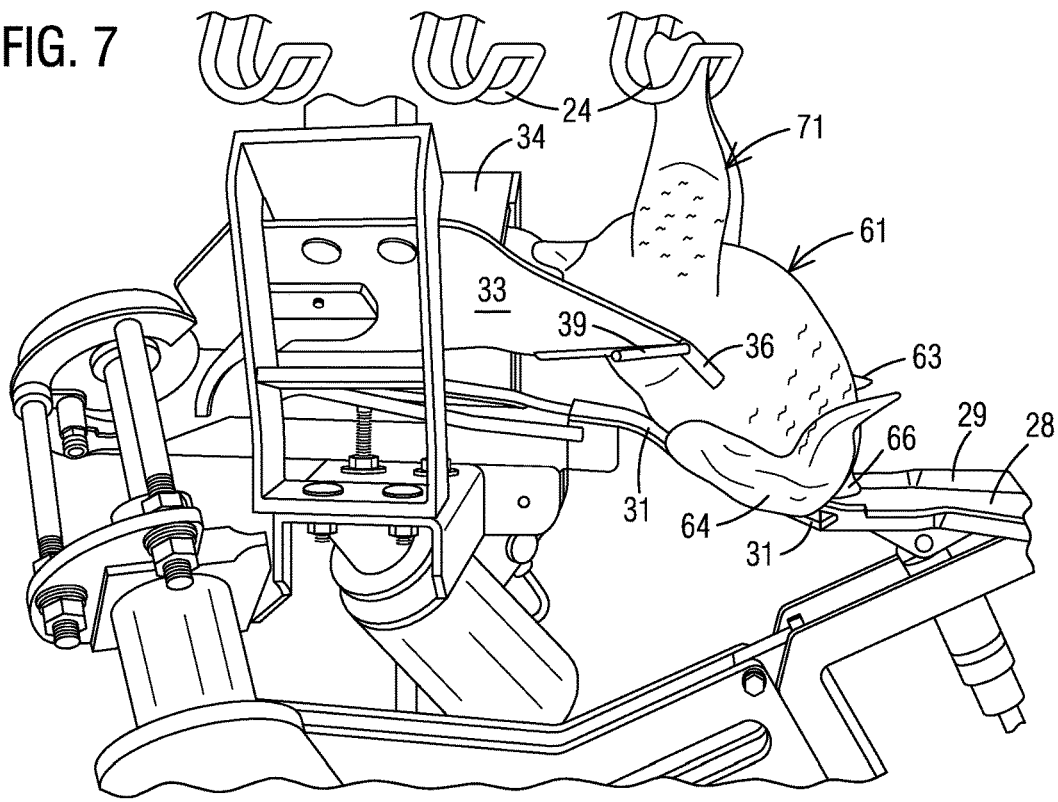
FIGS. 7-12 are a sequence of side views illustrating the steps that are carried out as a poultry carcass is pulled through the apparatus of FIG. 1 and as its wings are removed.

FIGS. 7-12 show a poultry carcass moving progressively through the apparatus of this invention for removal of its wings. In FIG. 7, the carcass 61 is suspended by its legs 71 from, and is conveyed to the left by, a shackle 24. The carcass 61 has passed the ejector plate 28 and is being pulled up the tilting sleds 31, which are tilting the carcass on its back. Guide bars 36 (visible) and 37 (not visible) have engaged the carcass on either side of the breast to align the carcass and guide it between lower edges of the hold-down plates 33 and 34. Wings 63 and 64 are un-folded to the side of the carcass beneath the guide bars 36 and 37.

Figure 8:
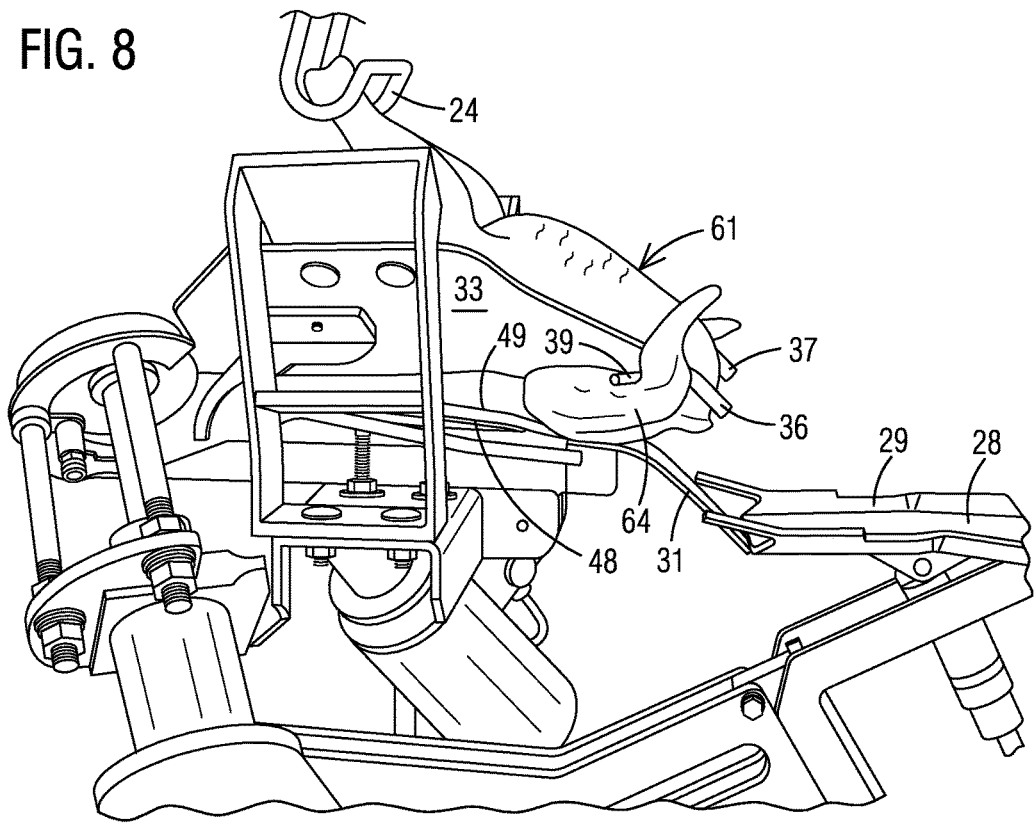

In FIG. 8, the carcass 61 has moved incrementally further along the processing path. The lower edges of the upper guide plates 33 (visible) and 34 (not visible) are firmly engaged with the carcass 61 between the sides of the breast and the forearms of the wings 63 (not visible) and 64 (visible). The legs are thus isolated from the carcass and extend generally outwardly to the side. Wing spreader bars 38 (not visible) and 39 (visible) are seen engaging the wings behind the wingtips urging the wings to spread outwardly. This ensures that the wings are spread out and that the wingtips (which may be tightly folded) do not accidently become captured beneath the hold-down plates. The back of the carcass in FIG. 8 is just engaging the back support bars 49 (visible) and 48 (not visible).

Figure 9:
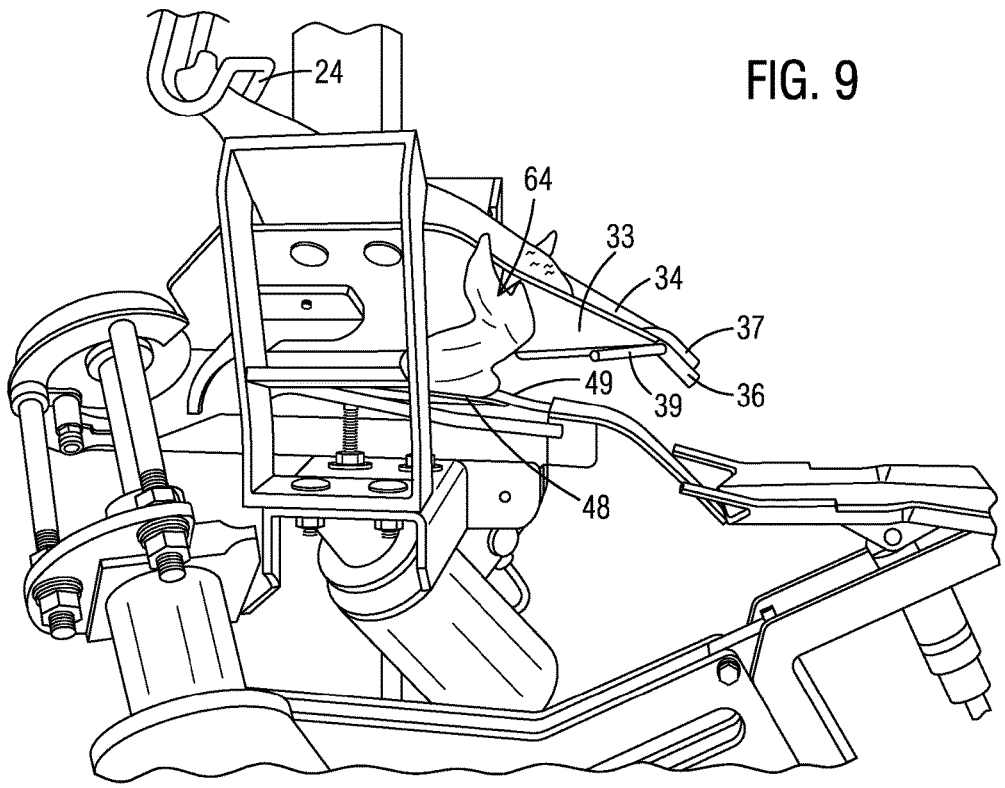

In FIG. 9, the carcass has moved a bit farther through the apparatus. Here, the entireties of the wings 63 and 64 are isolated from the carcass to the outsides of the hold down plates 32 and 33 and are substantially unfolded and stretched out. The back of the carcass is firmly held down onto the back support bars 48 and 49 and is moving toward the pre-cut blades 51 and 52 (not visible in FIG. 9).

Figure 10:
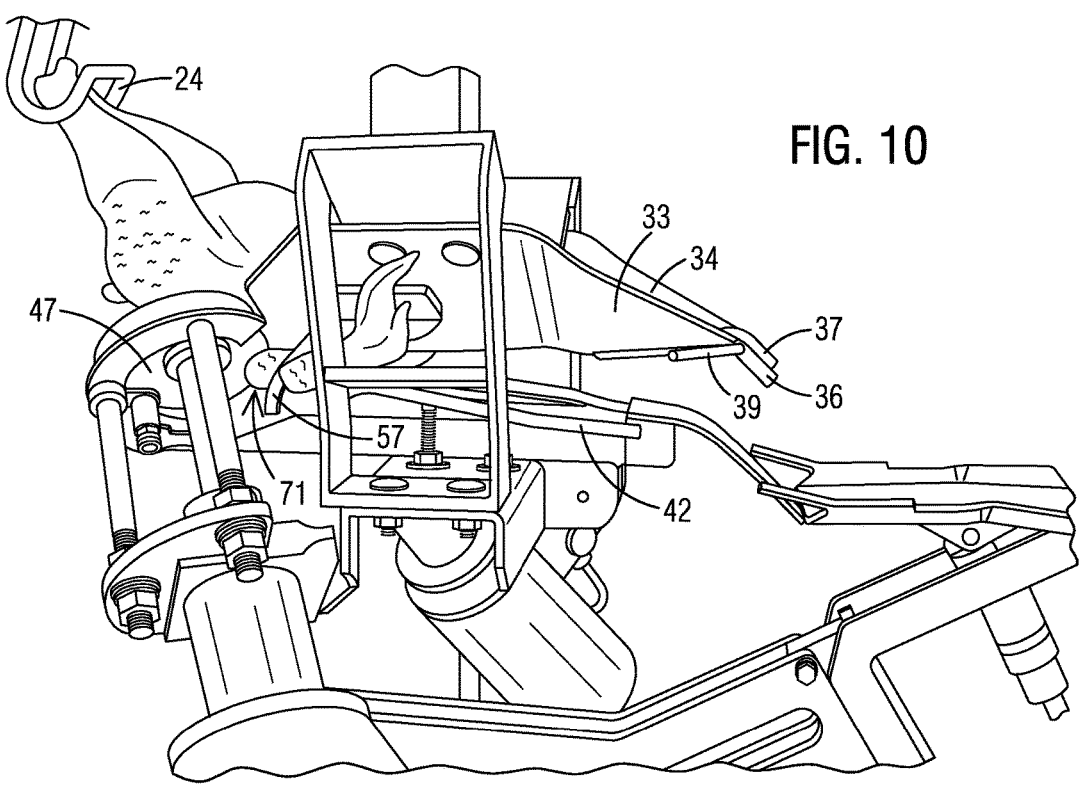

In FIG. 10, the carcass has moved farther. Between the position of FIG. 9 and that of FIG. 10, the sculpted upper edges of the back support bars 48 and 49 have urged the scapula bones of the carcass to their preferred positions generally overlying the sculpted edges of the back support bars. The pre-cut blades are in the process of forming pre-cuts along the back of the carcass on either side of the backbone in the vicinity of the shoulder joint and of cutting the major tendon at that location. At 71, the rotary blades 46 (not visible) and 47 (visible) have just begun to slice into the back meat ahead of the approaching wings.

Further, the wings have just engaged the curved stop bars 57 on either side of the hold down plates. The stop bars are beginning to retard or stop the downstream movement of the wings as the carcass continues to move downstream. Since major tendons have been or are in the process of being cut, retarding movement of the wings begins to tear the wings away from the carcass progressively where they have been cut. This, in turn, separates apart the balls and sockets of the dislocated shoulder joint a sufficient distance for the rotary blades 46 and 47 to slice between them without cutting bone or cartilage.

Figure 11:
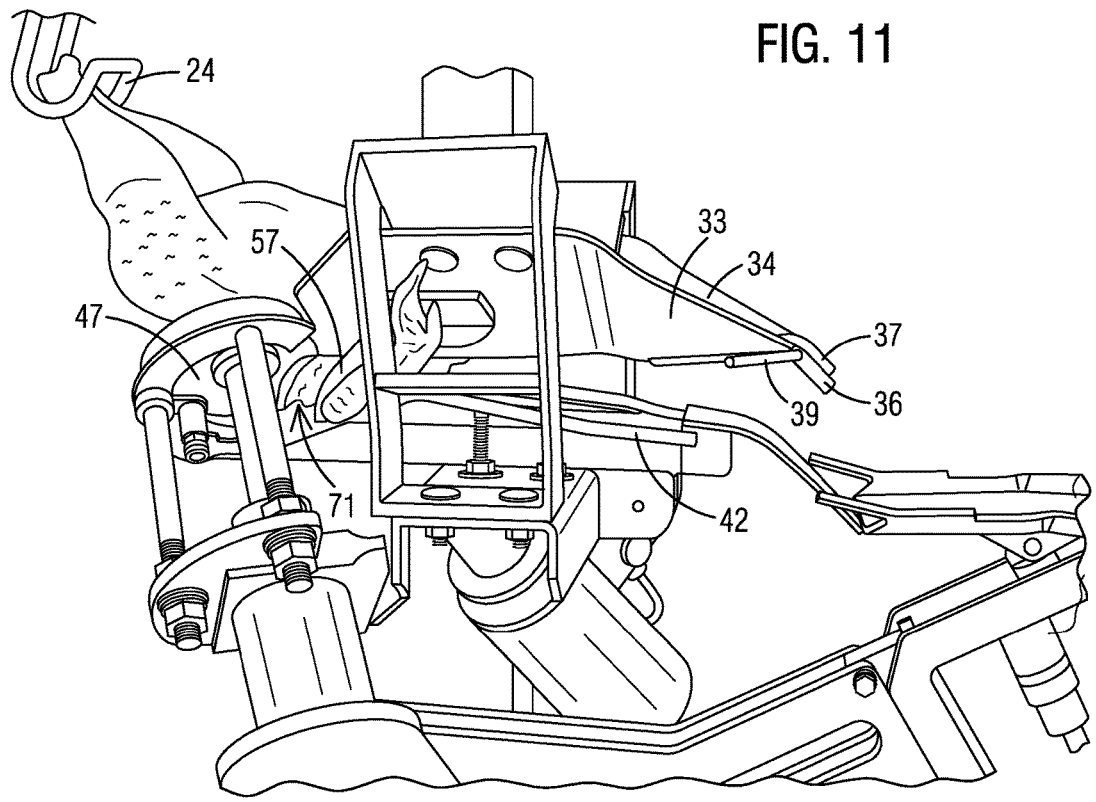

In FIG. 11, the carcass has moved a bit further. The rotary blades 46 and 47 have cut a substantial slice of back meat from the carcass as shown at 71 and are in the process of cutting between the dislocated and spaced apart balls and sockets of the shoulder joints. At this position, the stop bars 57 have not only stopped the progress of the wings, but their downturned ends are directing the wings in a downward direction. This helps to tear the wing away from the carcass as the rotary blades slice through the tissue and tendons at the shoulder joint. The result is a clean cut between the separated balls and sockets of the shoulders without cutting bone or cartilage, which produces shards and bone pieces.

Figure 13:
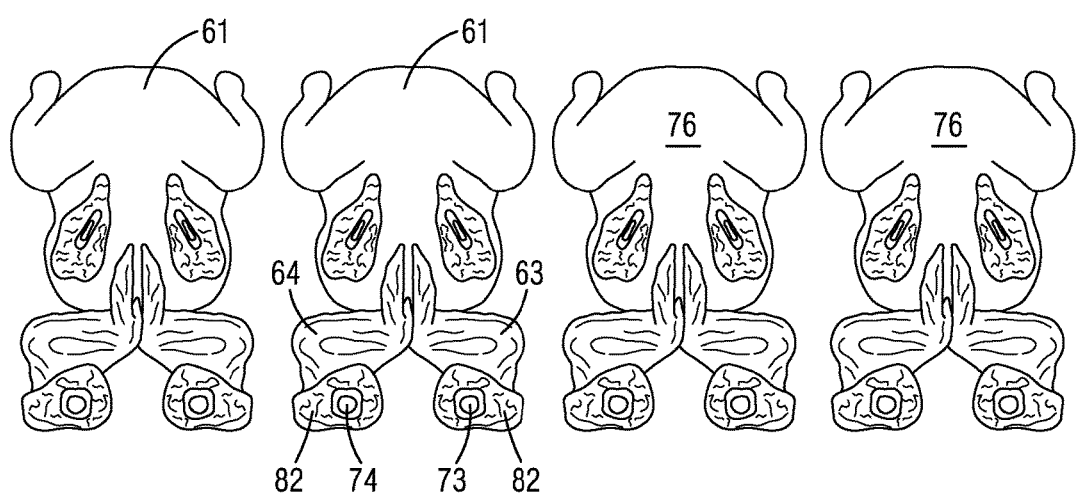
FIG. 13 shows several poultry carcasses and their removed wings illustrating the clean cuts and the inclusion of back meat with the removed wings.
Figure 12:
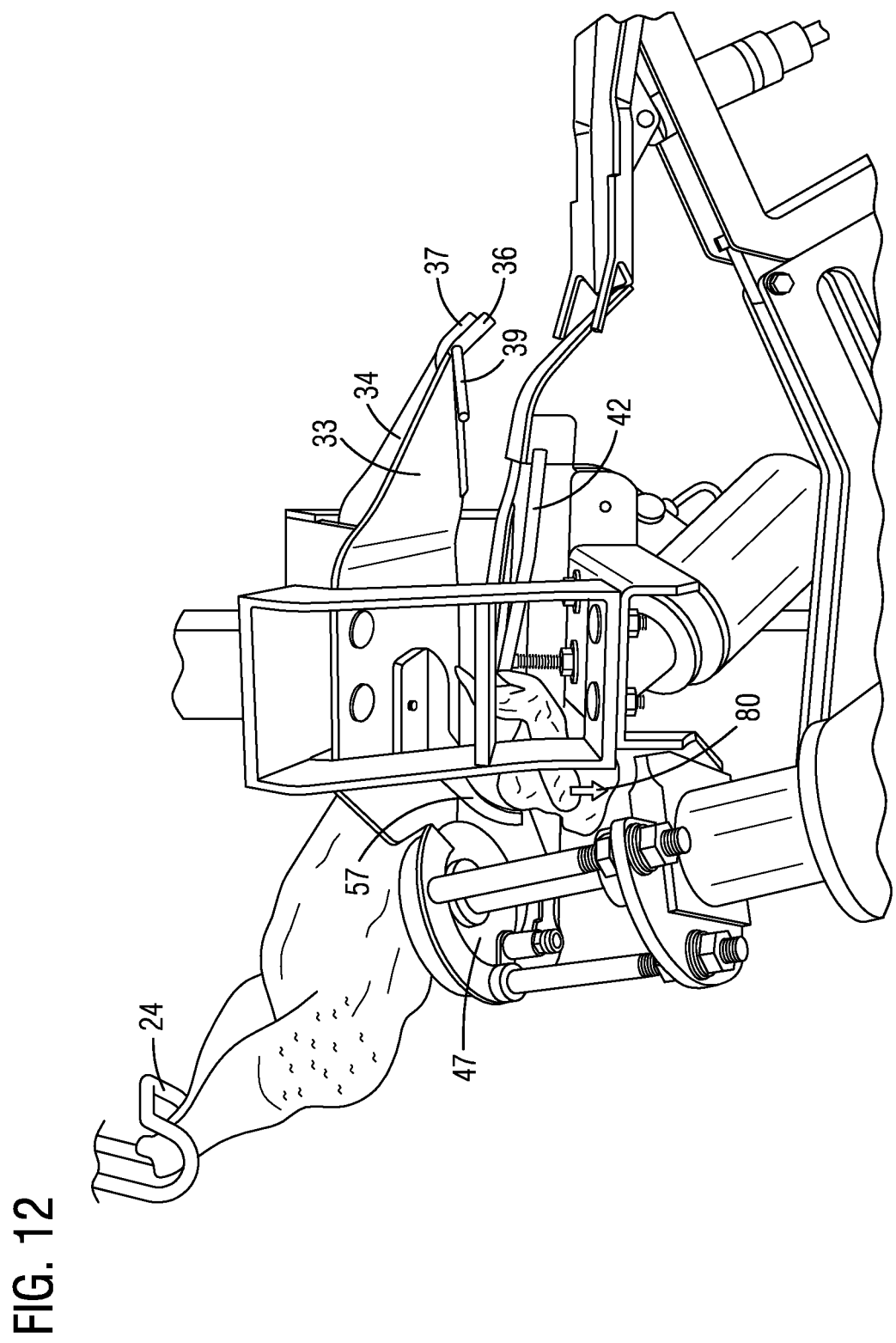

In FIG. 12, the wings have been completely severed from the carcass and are falling downwardly from the stop bars 57 to a collection station (not shown) below. FIG. 13 shows a number of poultry carcasses that have had their wings 63 and 64 removed according to principles of the present invention. It can be seen that the wings have been cut cleanly without cutting through bone. The untouched balls 73 of the shoulder joint are clean and white. This translates to no bone pieces or shards embedded in the meat of the wings. Further, the removed wings are large and meaty as desired since they have a chunk of back meat 82 remaining with them. Far more valuable breast meat has not been sacrificed, increasing the overall value of the bird.

The invention has been described herein within the context of example embodiments and methodologies considered by the inventors to represent the best mode of carrying out the invention. It will be understood by the skilled artisan, however, that the invention itself is not limited by the examples and embodiments present above. A wide gamut of additions, deletions, and modifications, both subtle and gross, might well be made by persons of skill in the art without departing from the spirit and scope of the invention, which is delineated only by the claims.

What is claimed is:

1. A method of separating wings from a poultry carcass comprising:
    moving the poultry carcass along a processing path suspended by the legs with the back of the poultry carcass facing the direction of movement;
    tilting the poultry carcass so that its back faces in a downward direction;
    supporting the back of the poultry carcass on either side of the backbone of the poultry carcass;
    positioning clavicles of the poultry carcass at predetermined locations to a side of the backbone of the poultry carcass;
    pre-cutting the poultry carcass from the back to sever tissue and tendons that attach bones of the wings to the clavicles allowing the balls and sockets of the shoulder joint to begin to separate;
    tensioning the wings to urge the wings away from the carcass and urge the balls and sockets of the shoulder joints apart;
    cutting between the balls and sockets of the shoulder joints to separate the wings progressively from the carcass; and
    collecting the separated wing.

2. The method of claim 1 wherein the tilting step comprises engaging the lower end of the poultry carcass as the carcass moves along the processing path to retard movement of the lower end and cause the poultry carcass to tilt.

3. The method of claim 1 wherein the supporting step comprises engaging the back of the poultry carcass with a pair of back support bars on either side of the backbone of the poultry carcass.

4. The method of claim 3 wherein the upper edge portions of the back support bars are contoured and configured to perform the step of positioning the clavicle as the poultry carcass is moved along the back support bars.

5. The method of claim 1 wherein the pre-cutting step comprises engaging the back of the poultry carcass with knives positioned adjacent to the back support bars.

6. The method of claim 5 wherein the knives are located outboard of the back support bars.

7. The method of claim 6 wherein the knives diverge in the direction of movement to position the pre-cuts for the step of cutting between the balls and sockets of the shoulder joints.

8. The method of claim 1 wherein the cutting step comprises engaging the carcass with a pair of rotary blades and the carcass is moved along the processing path.

9. The method of claim 1 wherein the collecting step comprises allowing the separated wings to fall to a collection location.

10. The method of claim 1 wherein the cutting step further comprises simultaneously cutting away a piece of back meat that remains on the separated wings.

11. An apparatus for separating wings from a poultry carcass comprising:
    a conveyor system configured to move the poultry carcass suspended by its legs from shackles sequentially along a processing path with the back of the poultry carcass facing the direction of movement;
    a tilting fixture configured to tilt the poultry carcass such that the back of the poultry carcass faces in a generally downward direction;
    a back support assembly configured to support the back of the poultry carcass as the poultry carcass moves along the processing path;
    pre-cut blades adjacent the back support assembly, the pre-cut blades being positioned to pre-cut the poultry carcass from the back at a position that severs tissue and tendons that attach the humerus bones of the wings to the poultry carcass thereby allowing the balls and sockets of the shoulder joint to begin to separate;
    rotary blades on either side of the processing path, the rotary blades being positioned and oriented to cut progressively between the balls and sockets of the shoulder joints to separate the wings from the carcass; and a tensioner configured to urge the wings away from the carcass as the rotary blades cut progressively between the balls and sockets thereby progressively separating the balls and sockets as the rotary blades execute their cut.

12. The apparatus of claim 11 wherein the back support assembly comprises a pair of spaced back support rails that engage the back of the poultry carcass on either side of the backbone.

13. The apparatus of claim 12 wherein the upper edges of the back support rails are configured to position the clavicles in a desired location for engagement by the pre-cut blades.

14. The apparatus of claim 11 wherein the rotary blades are serrated and driven by motors.

15. The apparatus of claim 11 wherein the pre-cut blades are disposed outboard of the back support assembly.

16. The apparatus of claim 15 wherein the pre-cut blades diverge in the direction of movement of the carcass to guide the precut toward the rotary blades.

17. The apparatus of claim 11 wherein the tensioner comprises a stop plate positioned to engage and retard movement of the wings as the rotary blades execute their cut.

18. The apparatus of claim 11 further comprising an ejection assembly at an upstream end of the apparatus configured to allow carcasses failing to meet a size criterion to bypass the apparatus and retain their wings.

19. The apparatus of claim 18 wherein the ejection assembly comprises and ejection plate and an actuator configured to flip the ejection plate up selectively to guide a carcass failing to meet a size criterion past the apparatus without being processed.

* * * * *